(12) United States Patent
Beecroft et al.

(10) Patent No.: US 12,034,650 B1
(45) Date of Patent: Jul. 9, 2024

(54) DISTRIBUTED STORAGE OF PACKET TRANSFORMATION INFORMATION IN FORWARDING HARDWARE

(71) Applicant: Hewlett Packard Enterprise Development LP, Spring, TX (US)

(72) Inventors: Jonathan Paul Beecroft, Bristol (GB); Anthony M. Ford, Bristol (GB); Trevor Alan Jones, Bridgwater (GB); Andrew S. Kopser, Seattle, WA (US); Joseph Orth, Longmont, CO (US); David Charles Hewson, Bristol (GB); Abdulla M. Bataineh, Vista, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/103,943

(22) Filed: Jan. 31, 2023

(51) Int. Cl.
| | |
|---|---|
| *G06F 15/16* | (2006.01) |
| *H04L 49/00* | (2022.01) |
| *H04L 49/25* | (2022.01) |
| *H04L 61/2592* | (2022.01) |

(52) U.S. Cl.
CPC ........ *H04L 49/3027* (2013.01); *H04L 49/252* (2013.01); *H04L 61/2592* (2013.01)

(58) Field of Classification Search
CPC .............. H04L 49/3027; H04L 49/252; H04L 61/2592
USPC .......................................................... 709/246
See application file for complete search history.

(56) References Cited

U.S. PATENT DOCUMENTS

| | | | | |
|---|---|---|---|---|
| 5,367,701 A * | 11/1994 | von Gnechten | ..... | G11C 7/1075 711/149 |
| 7,079,544 B2 * | 7/2006 | Wakayama | ............. | H04L 45/00 370/395.51 |
| 7,177,311 B1 * | 2/2007 | Hussain | ................... | H04L 45/00 370/395.32 |
| 7,522,604 B2 * | 4/2009 | Hussain | ................ | H04L 45/742 370/392 |

(Continued)

OTHER PUBLICATIONS

Bosshart et al., "P4: Programming Protocol-Independent Packet Processors", ACM SIGCOMM Computer Communication Review, vol. 44, No. 3, Jul. 2014, 8 pages.

(Continued)

*Primary Examiner* — Alicia Baturay
(74) *Attorney, Agent, or Firm* — Yao Legal Services, Inc.

(57) ABSTRACT

The efficient storage of transformation information in a switch is provided. A respective port of the switch can include a memory device capable of storing transformation information. During operation, the switch can apply a selection mechanism to the transformation information learned at the switch for identifying a target port. The switch can then store the information in the memory device of the target port. Upon receiving a packet, the ingress port can apply the selection mechanism to the header information of the packet for determining a location of a first piece of transformation information associated with the packet. The ingress port can obtain the first piece of transformation information by looking up the header information in the location and storing it in a local memory device. The ingress port can then transform the packet based on the first piece of transformation information for determining an egress port for the packet.

20 Claims, 11 Drawing Sheets

(56) References Cited

U.S. PATENT DOCUMENTS

| | | | | |
|---|---|---|---|---|
| 7,633,954 | B2 * | 12/2009 | Wakayama | H04L 49/354 370/395.5 |
| 8,111,690 | B2 * | 2/2012 | Hussain | H04L 49/70 370/392 |
| 9,083,613 | B2 * | 7/2015 | Jain | H04L 43/10 |
| 9,426,070 | B2 * | 8/2016 | Nishihashi | H04L 45/745 |
| 9,571,337 | B1 * | 2/2017 | Xu | H04L 41/00 |
| 10,489,310 | B2 * | 11/2019 | Keeton | G06F 12/14 |
| 10,541,918 | B2 * | 1/2020 | Singh | H04L 47/2483 |
| 11,394,813 | B1 * | 7/2022 | Petersen | H04L 69/22 |
| 11,641,326 | B2 * | 5/2023 | Papadantonakis | H04L 67/10 370/418 |
| 11,711,318 | B1 * | 7/2023 | Patronas | H04L 49/101 370/412 |
| 11,757,794 | B2 * | 9/2023 | Wu | H04L 61/5038 370/392 |
| 2004/0213272 | A1 * | 10/2004 | Nishi | H04L 45/00 370/401 |
| 2007/0268903 | A1 * | 11/2007 | Nakagawa | H04L 45/745 370/392 |

OTHER PUBLICATIONS

Github, "In-band Network Telemetry (INT) Dataplane Specification", Version 2.1, 2020, 56 pages.

* cited by examiner

DISTRIBUTED STORAGE OF PACKET TRANSFORMATION INFORMATION IN FORWARDING HARDWARE

STATEMENT OF GOVERNMENT-FUNDED RESEARCH

This invention was made with Government support under Contract Number H98230-15-D-0022/0007 awarded by the Maryland Procurement Office. The Government has certain rights in this invention.

BACKGROUND

Field

The present disclosure relates to communication networks. More specifically, the present disclosure relates to a method and system for distributing transformation information associated with packets among corresponding memory units of a switch.

BRIEF DESCRIPTION OF THE FIGURES

In the figures, like reference numerals refer to the same figure elements.

DETAILED DESCRIPTION

Figure 1A:
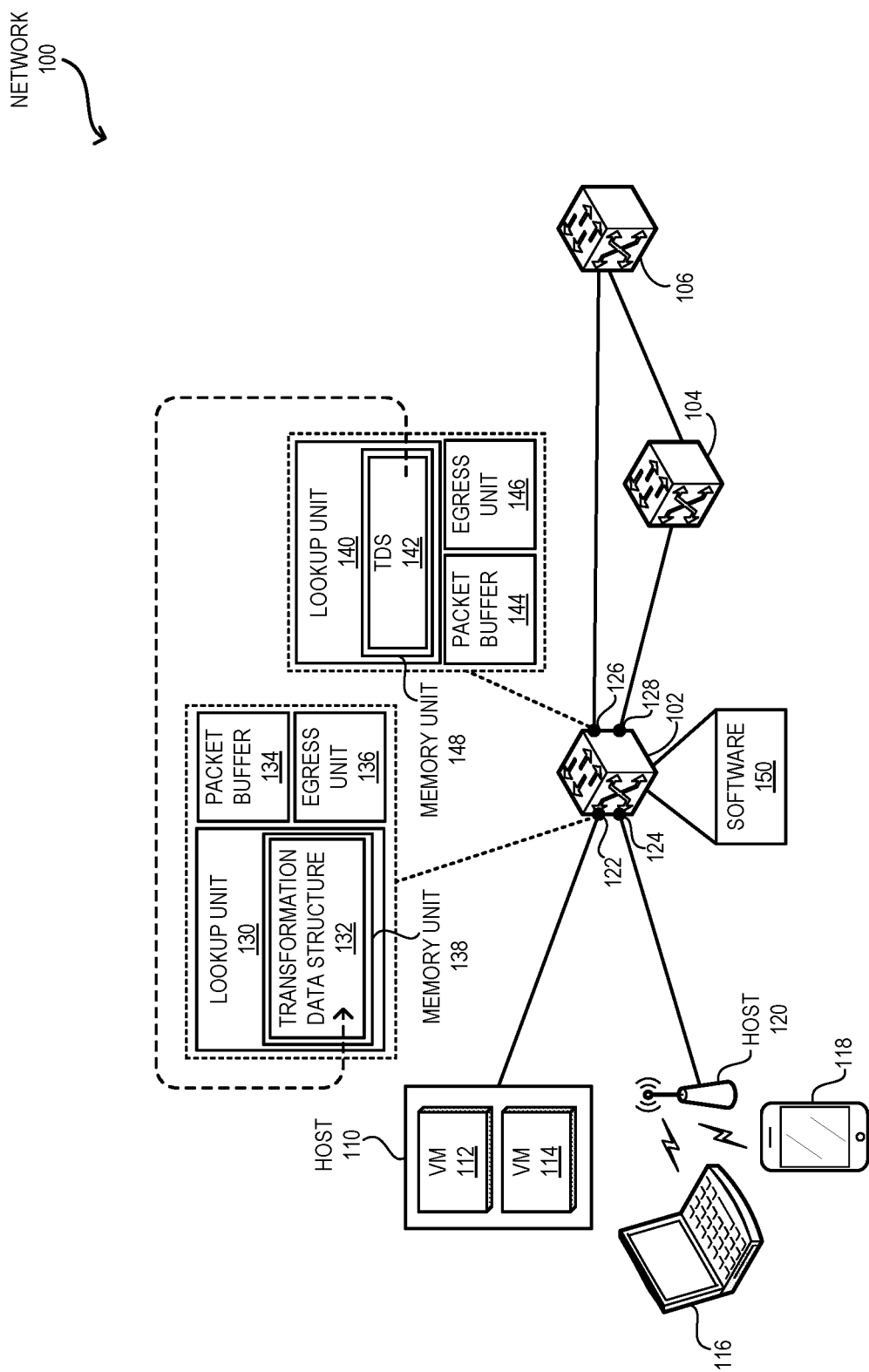
FIG. 1A illustrates an example of a network supporting distributed storage of packet transformation information in forwarding hardware of the switches, in accordance with an aspect of the present application.

The following description is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the aspects shown, but is to be accorded the widest scope consistent with the claims.

The Internet is the delivery medium for a variety of applications running on physical and virtual devices. Such applications have brought with them an increasing traffic demand. As a result, equipment vendors race to build switches with versatile capabilities, such as switches supporting high-performance computing (HPC). For example, a converged Ethernet and HPC switch can support a high-bandwidth network fabric and interface with processing units (e.g., a central processing unit (CPU) or a graphics processing unit (GPU)). The switch can obtain Ethernet packets (e.g., layer-2 frames) from a client device and forward the packets via the fabric to a processing unit. The switch can also forward packets via a Transmission Control Protocol (TCP)/Internet Protocol (IP) network.

To do so, the switch may perform a packet transformation on a respective packet. Packet transformation can include, but are not limited to, Ethernet to fabric translation, layer-2 header transformation (e.g., changing the source and destination media access control (MAC) addresses), layer-3 header transformation, tunnel encapsulation associated with a tunnel, packet mirroring to a port, packet snooping, traffic redirection, network measurements (e.g., In-band Network Telemetry interposition), and interoperability among different versions of protocol or network architecture. Examples of a tunnel can include, but are not limited to, VXLAN, Generic Routing Encapsulation (GRE), Network Virtualization using GRE (NVGRE), Generic Networking Virtualization Encapsulation (Geneve), Internet Protocol Security (IPsec), and Multiprotocol Label Switching (MPLS).

Packet transformation can support a number of features, such as flow steering, virtual local area network (VLAN) tagging, packet modification or stripping, and traffic class remarking. To ensure line-rate packet forwarding, the switch may need to maintain the transformation information in the memory units (e.g., random-access memory devices) available at a respective port of the switch. When an ingress port receives a packet, the port can obtain the relevant transformation information from the local memory unit, perform a packet transformation based on the information, and forward the packet to an egress port associated with the packet. However, due to the limited capacity, storing a large volume of packet transformation information can be challenging.

The aspects described herein solve the problem of efficiently storing packet transformation information in the forwarding hardware of a switch by (i) determining a target port for storing a respective piece of transformation information and storing it in a memory unit of the target port; (ii) if the information is not available at an ingress port of a packet, retrieving the information from the memory unit while storing the packet in a queue; and (iii) caching the information in a memory unit of the ingress port for forwarding the packet and subsequently received packets. Because the information is stored in the memory units of the ports, the ingress port can efficiently retrieve locally unavailable transformation information and forward corresponding packets at line rate. In this way, the transformation information learned by the switch can be distributed among the memory units of the ports of the switch without significantly compromising the performance of the switch.

With existing technologies, a high-capacity switch facilitating HPC can include a set of ports in the forwarding hardware of the switch. A respective port of the switch can be equipped with a memory unit to store transformation information, which can include information that can be used to transform a packet. The memory unit of a port can include a number of memory banks, each comprising a plurality of rows and columns of storage units. The physical limitation of hardware, such as silicon space, can limit the amount of memory (e.g., the number of memory banks) that can be deployed for a port. As a result, the memory unit of a respective port can store a limited number of entries with transformation information. Examples of the transformation information can include, but are not limited to, a network address (e.g., a MAC or an IP address), a fabric address, a switching label, a port identifier, and a tunnel identifier.

Furthermore, depending on the network topology, some ports (e.g., edge ports) of the switch may couple hosts, such as client or end devices. Examples of hosts can include, but are not limited to, laptops, desktops, printers, cellphones, tablets, Internet of Things (IoT) devices, and appliances. To facilitate packet transformation for the hosts, the edge ports of the switch may store a large number of entries with transformation information while others (e.g., core ports) may not. As a result, the memory unit at some ports can become over-utilized even though the memory units of the other ports can remain underutilized. In addition, a substantial number of such entries can be redundant entries because the same transformation information can be used by multiple ports.

To solve this problem, upon learning a piece of transformation information (e.g., a new MAC address or a newly configured VLAN), the switch can apply a selection mechanism to determine a target port. Examples of the selection mechanism can include, but are not limited to, a hash function, round-robin selection, and information-based selection (e.g., a specific type of transformation information is stored by a particular port). Typically, the software, which can be the operating system, of the switch can facilitate the configuration of the selection mechanism. Subsequently, the hardware of the switch can apply the selection mechanism by choosing a target port that is suitable for storing the transformation information. For example, the selection mechanism can select a target port that is most likely to use the transformation information. As a result, the transformation information for most packets can be located at the ingress port of the packets. The switch can then generate an entry in the memory unit of the target port and store the transformation information in the entry. Therefore, the memory unit in the control circuitry of the target port can be used for storing the transformation information. An entry determined by the selection mechanism can be referred to as a distributed entry. A distributed entry may not be timed out, and can be updated or removed if the corresponding transformation information changes or becomes irrelevant, respectively.

When a packet of a data flow is received at an ingress port, the port can determine the header information (e.g., the source and destination addresses, and a traffic class). The port can then look up the header information in the local memory unit. If the looking-up operation does not find the corresponding header information, the port can apply the selection mechanism to the header information to determine the location of the entry storing the corresponding transformation information. If the entry is located at a remote port of the switch, the ingress port can fetch the information from the entry in the memory unit of the remote port. The port can then store the information in an entry of the local memory unit. Such an entry can be referred to as a cached entry, which can be timed out if not used for a predetermined period. The memory unit of a respective port can be divided into two segments for distributed and cached entries. Alternatively, the memory units of a respective edge port of the switch may store cached entries while the memory unit of a core port (e.g., a port without edge operations) may store distributed entries.

During the fetching process, a respective packet of the flow can be stored in a flow queue dedicated to the flow. The flow queue can be in a packet buffer of the ingress port. The packet buffer can store a plurality of flow queues, each dedicated to a particular flow. Packets sent to the same destination in the same traffic class can be associated with a unique flow. Accordingly, all packets of a flow can need the same transform information and hence, can share a single piece of transform information from the memory unit. It should be noted that two different flows may or may not be using the same translation. A respective flow can be defined by one or more of: the source and destination addresses (e.g., IP and/or MAC addresses) of a packet, the source and destination addresses of multiple headers, traffic class, protocol port numbers (e.g., TCP or User Datagram Protocol (UDP) port numbers), VLAN tags, an Ethertype field, a differentiated services code point (DSCP) field, a protocol field, an encapsulation header type, a network indicator (e.g., a virtual network identifier (VNI)) in the encapsulation header, and the corresponding fields in the inner layer-2, layer-3, and protocol headers. When the cached entry is generated, the transformation information can also be provided to the flow queue. Packets in the flow queue, which can be one of several, can then be sequentially transformed based on the entry and forwarded based on the transformation. For all subsequent packets, the entry can provide the transformation information. In this way, the memories of all ports of the switch can be used to accommodate a large volume of transformation information.

The transformation information can be further distributed to other switches in a network. In particular, some switches, such as access switches, may need to store a large volume of transformation information in the respective memory units. On the other hand, the memory units of some other switches of the network, such as core switches, may remain underutilized. The access switches can then offload some transformation information to nearby switches (e.g., switches at one or two hops distance). The selection mechanism may identify the pieces of transformation information that are infrequently accessed and select a nearby switch for offloading. If needed, the ingress port of a packet can request the information from the nearby switch, obtain the information, and perform the transformation on the packet. To facilitate this, when a switch learns the transformation information at a port, the switch may cache it at the port while storing it at the nearby switch. Consequently, if another port needs the same transformation information, the other port can obtain it from the cached entry, thereby avoiding fetching from the nearby switch.

In this disclosure, the term "switch" is used in a generic sense, and it can refer to any standalone or fabric switch operating in any network layer. "Switch" should not be interpreted as limiting examples of the present invention to layer-2 networks. Any device that can forward traffic to an external device or another switch can be referred to as a "switch." Any physical or virtual device (e.g., a virtual machine or switch operating on a computing device) that can forward traffic to an end device can be referred to as a "switch." Examples of a "switch" include, but are not limited to, a layer-2 switch, a layer-3 router, a routing switch, a component of a Gen-Z network, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

FIG. 1A illustrates an example of a network supporting distributed storage of packet transformation information in forwarding hardware of the switches, in accordance with an aspect of the present application. A network 100 can include a number of switches 102, 104, and 106, and may include heterogeneous network components, such as layer-2 and layer-3 hops, and tunnels. In some examples, network 100 can be an Ethernet, InfiniBand, or other networks, and may use a corresponding communication protocol, such as Internet Protocol (IP), FibreChannel over Ethernet (FCoE), or other protocol. Network 100 may include a high-capacity fabric that can support HPC. A respective switch in a respective fabric can be associated with a MAC address and an IP address.

Switch 102 can be coupled to switches 104 and 106 via ports 126 and 128, respectively. In the example in FIG. 1A, switch 102 can be an access switch coupling a host 110 via port 122. Examples of a host can include, but are not limited to, laptops, desktops, servers, printers, cellphones, tablets, IoT devices, and appliances. Host 110 can be a server hosting a number of virtual machines (VMs) 112 and 114. Furthermore, port 124 of switch 102 can be coupled to an access point (AP) 120 providing wireless connectivity to hosts 116 and 118. Hence, an individual port of switch 102 can be coupled to a large number of physical or virtual devices. As a result, the port may need to support a large volume of transformation information. The transformation information can include, but is not limited to, a network address (e.g., a MAC or an IP address), a fabric address, a switching label, a port identifier, and a tunnel identifier.

With existing technologies, a respective port of switch 102 can be deployed on the forwarding hardware of switch 102. The forwarding hardware can include one or more of: a pluggable network interface controller (NIC), a soldered NIC, and a switch backplane. A respective port of switch 102 can be equipped with a memory unit. For example, ports 122 and 126 can support memory units 138 and 148, respectively. Memory units 138 and 148 can include ternary content-addressable memory (TCAM) and exact-match hash tables. Memory units 138 and 148 can include transformation data structures (TDSs) 132 and 142, respectively, for storing transformation information. A TDS can include a set of TCAM entries, each storing a piece of transformation information that can be looked up using corresponding header information. In some examples, a TDS can be an exact-match hash table.

Port 122 can be equipped with a lookup unit 130 that includes memory unit 138, a packet buffer 134, and an egress unit 136. Similarly, port 126 can be equipped with a lookup unit 140 that includes memory unit 148, a packet buffer 144, and an egress unit 146. Lookup units 130 and 140 can be implemented in the control circuitry of ports 122 and 126, respectively. The physical limitation of the hardware of ports 122 and 126, such as silicon space, can limit the amount of memory (e.g., the number of memory banks) that can be deployed in memory units 138 and 148, respectively. As a result, memory units 138 and 148 can store a limited number of entries with transformation information. Furthermore, since ports 122 and 124 couple hosts, ports 122 and 124 may store a large number of entries with transformation information while ports 126 and 128 may not. As a result, memory unit 138 can become over-utilized even though memory unit 148 can remain underutilized. In addition, a substantial number of such entries can be redundant entries because the same transformation information can be used by ports 122 and 124.

To solve this problem, memory units of all ports of switch 122 can be used to accommodate a large volume of transformation information. Upon learning a piece of transformation information (e.g., a new MAC address or a newly configured VLAN), switch 102 can apply a selection mechanism to determine a target port for the transformation information. For example, switch 102 can apply a hash function on the transformation information. The output of the hash function can be a value indicative of the target port, such as an identifier or address. The selection mechanism can be configured in software 150, which can be the operating system, of switch 102. Subsequently, the selection mechanism is maintained in the hardware, which can then apply the selection mechanism to the learned transformation information. Switch 102 can then generate an entry in the memory unit of the target port and store the transformation information in the entry.

If the target port is a local port, such as port 122, the entry can be in TDS 132 of memory unit 138. On the other hand, if the target port is a remote port, such as port 126, the entry can be in TDS 142 of memory unit 148. Since the entry is generated by the selection mechanism, the entry in TDS 132 or 142 can be a distributed entry. During operation, a packet of a data flow can be received at port 122. The flow can be defined by the source and destination addresses of the packet, and optionally, by the protocol ports (e.g., TCP ports). Lookup unit 130 can then determine the header information (e.g., the source and destination addresses) of the packet. Subsequently, the selection mechanism is applied to the header information to determine the location of the entry, such as port 122 or 126. If the entry is located at port 122, lookup unit 130 can retrieve the information from TDS 132. However, if the entry is located at port 126, lookup unit 130 can fetch the information from TDS 142 and cache it in TDS 132 (e.g., in a segment allocated for caching). Cached transformation information can be timed out if not used for a predetermined period. Since the timer for a cached entry can be reset whenever the transformation information of the entry is accessed, a frequently accessed entry may remain valid for a prolonged period.

During the fetching process from port 126, lookup unit 130 can store a respective packet of the flow in a flow queue dedicated to the flow. The flow queue can be in packet buffer 134. Packet buffer 134 can store a plurality of flow queues, each dedicated to a particular flow, and may be allocated a finite amount of memory space. In addition to caching, lookup unit 130 can provide the obtained transformation information to the flow queue. Packets in the flow queue can then be sequentially transformed based on the transformation information and forward the packets based on the transformation to an egress port. For all subsequent packets, the cached transformation information can support the packet transformation. On the other hand, if the transformation information is originally stored in TDS 132, port 122 can transform the packets without buffering them in the flow queue. For example, port 122 can transform the packets before loading them into the flow queue or bypass the flow queue. In either case, switch 122 can ensure efficient packet transformation.

Figure 1B:
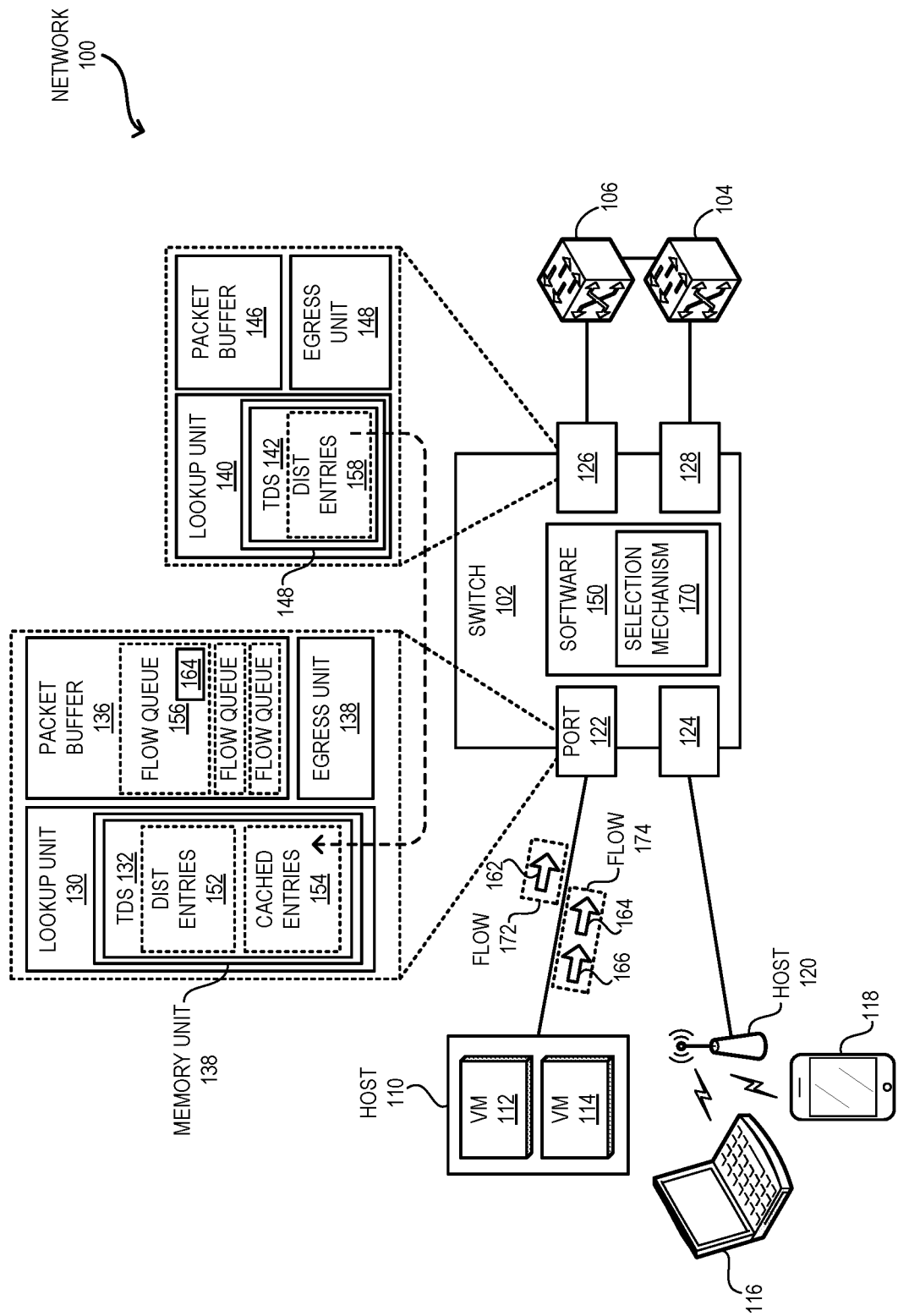
FIG. 1B illustrates an example of a switch facilitating distributed storage of packet transformation information in the forwarding hardware of the switch, in accordance with an aspect of the present application.

FIG. 1B illustrates an example of a switch facilitating distributed storage of packet transformation information in the forwarding hardware of the switch, in accordance with an aspect of the present application. When switch 102 learns a new piece of transformation information, software 150 can configure a selection mechanism 170 on the transformation information to determine a target port. The memory unit in the control circuitry of the target port can then store the transformation information. If selection mechanism 170 selects port 122 or 126 as the target port, software 150 can generate a distributed entry in TDS 132 or 142, respectively. Since switch 102 may learn several pieces of transformation information, software 150 can generate a set of distributed entries in the memory units of a respective port of switch 102. For example, software 150 can generate distributed entries 152 and 158 in TDS 132 and 142, respectively. Consequently, lookup units 130 and 140 may not insert an entry into distributed entries 152 and 158, respectively.

During operation, a packet 162 of a data flow 172 can be received at port 122. Lookup unit 130 can retrieve the header information from packet 162. Software 150 can then apply selection mechanism 170 on the header information. Suppose that selection mechanism 170 indicates that the target port for the relevant transformation information is port 122. Since the transformation information is available at the ingress port of packet 162, lookup unit 130 can look up the header information of packet 162 in TDS 132 to identify an entry comprising the transformation information from distributed entries 152. Look up unit 130 can then obtain the transformation information from the entry. Port 122 can perform the transformation operation on packet 162 based on the transformation information and provide packet 162 to the egress port. If port 126 is the egress port, egress unit 148 can receive transformed packet 162 and forward it via port 126. Hence, if the transformation information is available at the ingress port of a packet, switch 102 can forward the packet at the line rate.

Performing the transformation operation on packet 162 can include one or more of: translating a MAC address of packet 162 to a fabric address if network 100 includes a fabric, changing the source and destination MAC addresses of packet 162 (e.g., using the respective MAC addresses of switches 102 and 106), transforming a layer-3 address of packet 162 (e.g., generating and inserting an IP version 6 address), encapsulating packet 162 with a tunnel header if switches 102 and 106 are coupled via a tunnel, generating a copy of packet 162 for mirroring it to a port, modifying the packet for a different version of a protocol (e.g., different versions of IP), and adding one or more VLAN tags to packet 162.

When a packet 164 of another data flow 174 is received at port 122, lookup unit 130 can retrieve the header information from packet 164. Software 150 can then apply selection mechanism 170 on the header information and may determine that the target port for the relevant transformation information is port 126. Since the transformation information is not available at the ingress port of packet 164, port 122 can store packet 164 in a flow queue 156 in packet buffer 136. Here, flow queue 156 can be dedicated to a respective packet belonging to data flow 174. Since port 126 is the target port, the transformation information for packet 164 can be stored in TDS 142.

Port 122 can then request the transformation information from port 126. Based on the request, lookup unit 140 can look up the header information of packet 164 in TDS 142 to identify an entry comprising the transformation information from distributed entries 158. Look up unit 140 can then obtain the transformation information from the entry. Port 126 can then provide the transformation information to port 122. Upon receiving the transformation information, port 122 can generate a cached entry for storing the transformation information. The cached entry can be one of cached entries 154 in TDS 132. Hence, TDS 130 can be divided into two segments for distributed entries 152 and cached entries 154. When the cached entry is generated, port 122 can provide the transformation information to flow queue 156.

Packet 164 in flow queue 156 can then be transformed based on the transformation information and forwarded to the egress port. Since the transformation information is retrieved from another port of switch 102 using the hardware of switch 102, the retrieval process can be quick. In particular, subsequent packets requiring the same transformation information can be buffered in the same flow queue while the transformation information is fetched from the distributed entry at the target port 126. As a result, port 122 can receive packets at full bandwidth, and when the transformation information is available, can transmit them at full bandwidth. Since a single fetch can provide the transformation information for a large number of packets, the delay incurred due to the fetching of the transformation information may not adversely affect the forwarding of packet 164. For all subsequent packets of data flow 174, such as packet 166, the cached entry can provide the transformation information. Port 122 can then perform the transformation operation on packet 166 based on the transformation information and provide packet 166 to the egress port. Once the transformation information is cached in TDS 132, switch 102 can continue to forward packet 166 at the line rate. Even though the fetching may slightly increase the switching latency, the switching bandwidth of switch 102 is not reduced. Because the respective transformation information for different flow queues can be fetched in parallel, switch 102 can continue to receive packets at the line rate and subsequently transmit them at the line rate without blocking the arrival of new packets. In this way, switch 102 can maintain the full transmission bandwidth.

Figure 2:
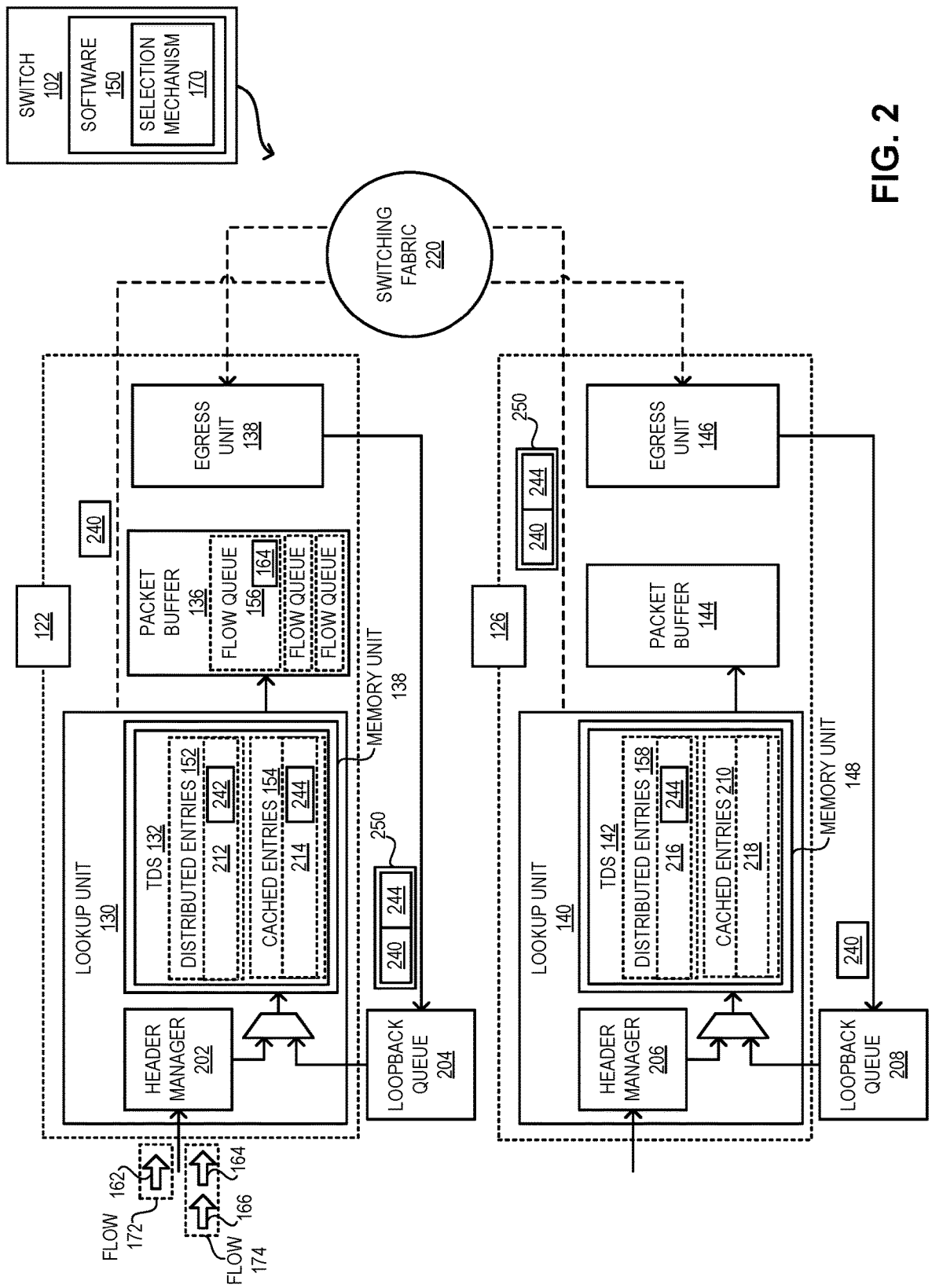
FIG. 2 illustrates an example of a switch obtaining packet transformation information from distributed storage in the forwarding hardware of the switch, in accordance with an aspect of the present application.

FIG. 2 illustrates an example of a switch obtaining packet transformation information from distributed storage in the forwarding hardware of the switch, in accordance with an aspect of the present application. Ports 122 and 126 can be equipped with header managers 202 and 206, respectively. A header manager of a port can extract the header information from a packet received at the port. When switch 102 receives packet 162 at port 122, header manager 202 of lookup unit 130 can retrieve the header information from packet 162. Subsequently, by applying selection mechanism 170 on the header information, it can be determined that port 122 stores transformation information 242 associated with the header information. Lookup unit 130 can look up the header information of packet 162 in TDS 132 to identify entry 212 in distributed entries 152 and obtain transformation information 242 from entry 212. Port 122 can perform the transformation operation on packet 162 based on transformation information 242.

On the other hand, when port 122 receives packet 164, header manager 202 can retrieve the header information from packet 164. By applying selection mechanism 170 on the header information, it can be determined that remote port 126 of switch 102 stores transformation information 244 associated with the header information. Packet 164 can then be stored in flow queue 156 dedicated to flow 174. Here, flow queue 156 can be one of a plurality of flow queues in packet buffer 134. Lookup unit 130 can generate a control packet 240 based on the header information. Packet 240 can be a specialized packet for retrieving transformation information from a remote port. Packet 240 may include the subset of the header information necessary to identify the entry comprising transformation information 244. Such information can be included in the header of packet 240. Therefore, the payload of packet 240 can include the minimum number of bits (e.g., trailing bits) necessary to generate packet 240. Lookup unit 130 can provide packet 240 to egress unit 146 of port 126 via switching fabric 220 (e.g., a crossbar fabric) of switch 102. Switching fabric 220 can facilitate the packet pipeline of switch 102.

Egress unit 146 is responsible for egressing packet via port 126. However, TDS 142, which stores transformation information 244, can be stored in memory unit 148 of lookup unit 140. To ensure that packet 240 can be provided to lookup unit 140, port 126 can be equipped with a loopback queue 208 that allows packets to loop back from egress unit 146 to lookup unit 140. Accordingly, egress unit 146 can insert packet 240 into queue 208. Lookup unit 140 can obtain packet 240 from queue 208. If queue 208 is a first-in-first-out (FIFO) queue, lookup unit 140 may dequeue the packet stored at the head (or top) of the queue. Header manager 206 of lookup unit 140 can retrieve the header information from packet 240.

Lookup unit 140 can look up the header information of packet 240 in TDS 142 to identify entry 216 in distributed entries 158 and obtain transformation information 244 from entry 216. Lookup unit 140 can insert transformation information 244 into the payload of packet 240 to generate a response packet 250. Lookup unit 140 can then provide packet 250 to egress unit 136 of port 122 via switching fabric 220. Egress unit 136 can insert packet 250 into loopback queue 204. Subsequently, lookup unit 130 can retrieve packet 250 from queue 204 and identify packet 250 as a response packet from a remote port (e.g., based on an indicator in packet 250). Lookup unit 130 can then obtain transformation information 244 from packet 250 and store it in a cached entry 214 in TDS 132. In the same way, lookup unit 140 can create cached entries 210, such as entry 218, in TDS 142 to store transformation information obtained from a remote port.

When cached entry 214 is generated, port 122 can provide transformation information 244 to flow queue 156. Packet 164 in flow queue 156 can then be transformed based on transformation information 244 and forwarded to the egress port. For all subsequent packets of data flow 174, such as packet 166, cached entry 214 can provide transformation information 244. Port 122 can then perform the transformation operation on packet 166 based on transformation information 244 and provide packet 166 to the egress port. In this way, even if switching fabric 220 couples a lookup unit of a port to an egress unit of another port, transformation information can be exchanged between ports based on the loopback queues. This architecture of switch 102 ports 122, 124, 126, and 128 store transformation information in a distributed manner.

Figure 3:
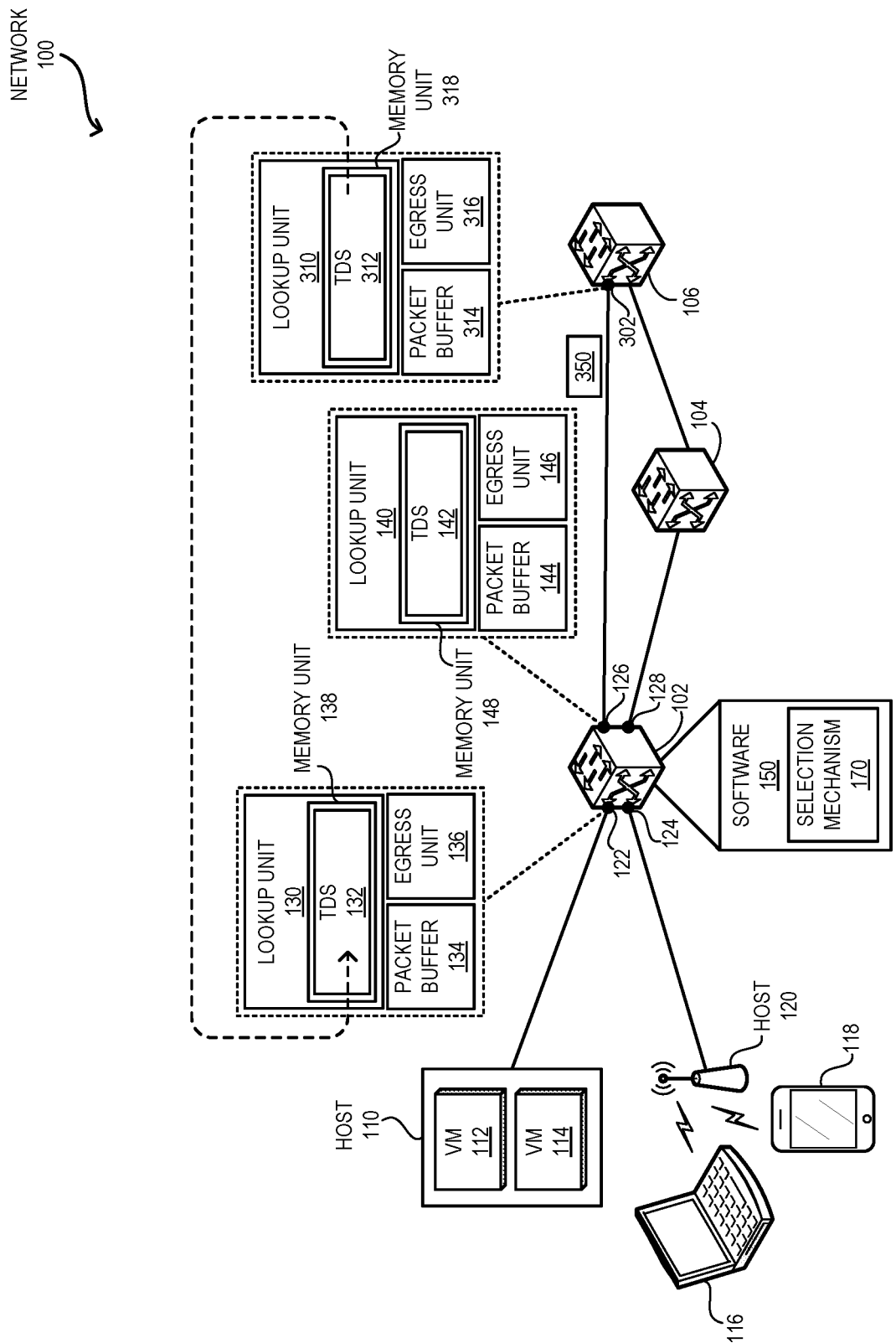
FIG. 3 illustrates an example of a network supporting distributed storage of packet transformation information in respective forwarding hardware of a plurality of switches, in accordance with an aspect of the present application.

FIG. 3 illustrates an example of a network supporting distributed storage of packet transformation information in respective forwarding hardware of a plurality of switches, in accordance with an aspect of the present application. In network 100, switch 102 can be an access switch, and switches 104 and 106 can be core switches. A network often needs to deploy a large number of access switches. Hence, it can be desirable to design an access switch in a cost-effective way. To do so, the access switch can be equipped with low-memory units at its ports. For example, memory units 138 and 148 can be low-capacity memory units to reduce the cost of switch 102. Consequently, the ports of switch 102 may not have sufficient memory capacity to store the transformation information associated with switch 102.

Hence, the transformation information associated with switch 102 can be further distributed to switch 106. In particular, switch 102 may need to store a large volume of transformation information. On the other hand, since switch 106 may not couple hosts, switch 106 may be associated with a relatively small volume of transformation information. As a result, the memory units of switch 106 may remain underutilized. Switch 102 can then offload some transformation information to switch 106. Selection mechanism 170 may identify the pieces of transformation information that are infrequently accessed at switch 102 and offload them to switch 106. Upon learning a piece of transformation information, software 150 can apply selection mechanism 170 to determine a target port for the transformation information. The target port information can identify a port and a switch of the port. If the transformation information is to be offloaded to port 302 of switch 106, the application of selection mechanism 170 can generate an identifier of switch 106 and a port number of port 302.

Switch 102 can then send a control packet 350 comprising the transformation information and the target port information. Upon receiving control packet 350, port 302 can store the transformation information in TDS 312 in memory unit 318 of port 302. The corresponding entry can be a distributed entry. During operation, a packet of a data flow can be received at port 122. The selection mechanism is applied to the header information of the packet to determine the location of the entry. If the entry is located at port 302 of switch 106, lookup unit 130 can fetch the transformation information from TDS 312 and cache it in TDS 132 in a cached entry. The packet can then be transformed based on the transformation information fetched from switch 106. In this way, the transformation information associated with switch 102 can be stored in multiple switches of network 100.

Figure 4A:
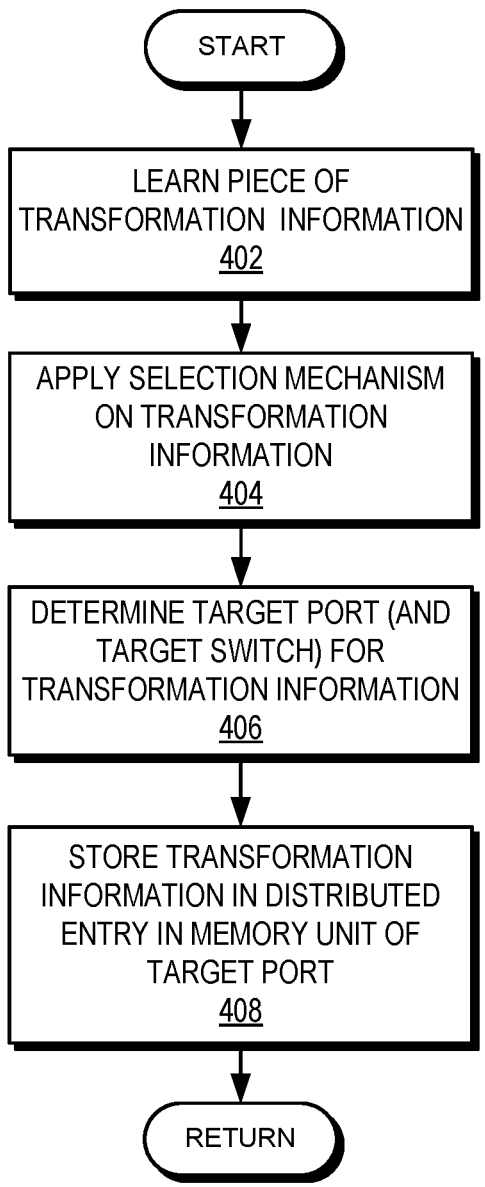
FIG. 4A presents a flowchart illustrating the process of a switch facilitating distributed storage of packet transformation information in the forwarding hardware of the switch, in accordance with an aspect of the present application.

FIG. 4A presents a flowchart illustrating the process of a switch facilitating distributed storage of packet transformation information in the forwarding hardware of the switch, in accordance with an aspect of the present application. During operation, the switch can learn a piece of transformation information (operation 402) and apply the selection mechanism to the transformation information (operation 404). The switch can then determine the target port (and optionally, a target switch) for the transformation information (operation 406). The switch can then store the transformation information in a distributed entry in the memory unit of the target port (operation 408). If the selection mechanism determines a target switch, as described in conjunction with FIG. 3, the target port can be on the target switch.

Figure 4B:
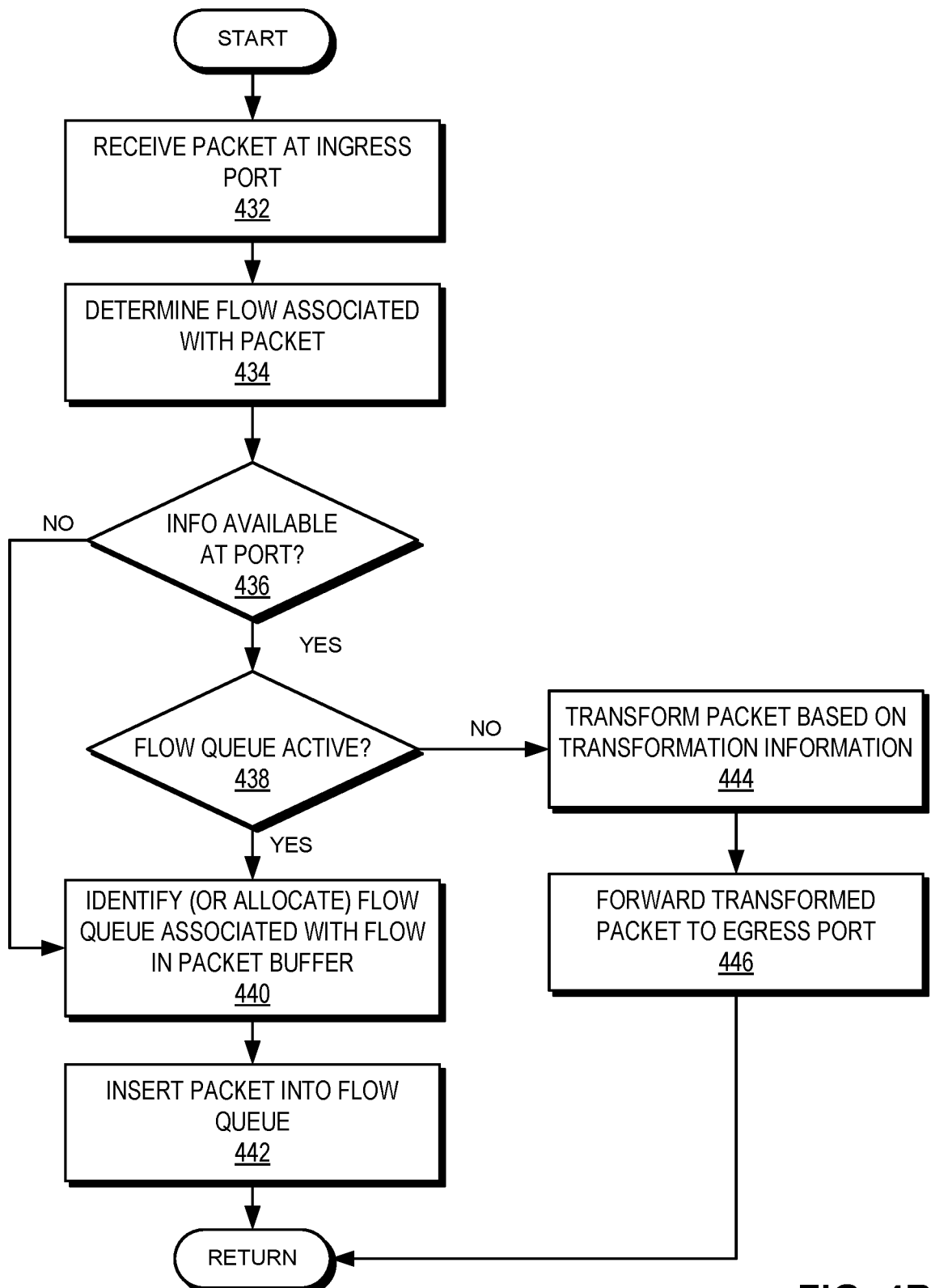
FIG. 4B presents a flowchart illustrating the process of a switch processing a packet at an ingress port based on the availability of transformation information, in accordance with an aspect of the present application.

FIG. 4B presents a flowchart illustrating the process of a switch processing a packet at an ingress port based on the availability of transformation information, in accordance with an aspect of the present application. During operation, the switch can receive a packet at an ingress port (operation 432) and determine the flow associated with the packet (operation 434). The source may determine the flow based on the source and destination addresses, and optionally, based on the port information of the packet. The switch can then determine whether the transformation information is available at the port (operation 436). If the transformation information is available at the port, the switch may also determine whether the flow queue is active (e.g., a flow queue is allocated for the flow) (operation 438).

If the flow queue is not active, the switch either didn't allocate a flow queue or emptied the flow queue. The switch can then transform the packet based on the transformation information (operation 444) and forward the transformed packet to the egress port (operation 446). On the other hand, if the transformation information is not available at the port or the flow queue is active, the switch can identify the flow queue associated with the flow in the packet buffer (operation 440). If the packet is an initial packet of the flow, the switch may allocate the flow queue in the packet buffer for the flow. Subsequently, the switch can insert the packet in the flow queue (operation 442).

Figure 4C:
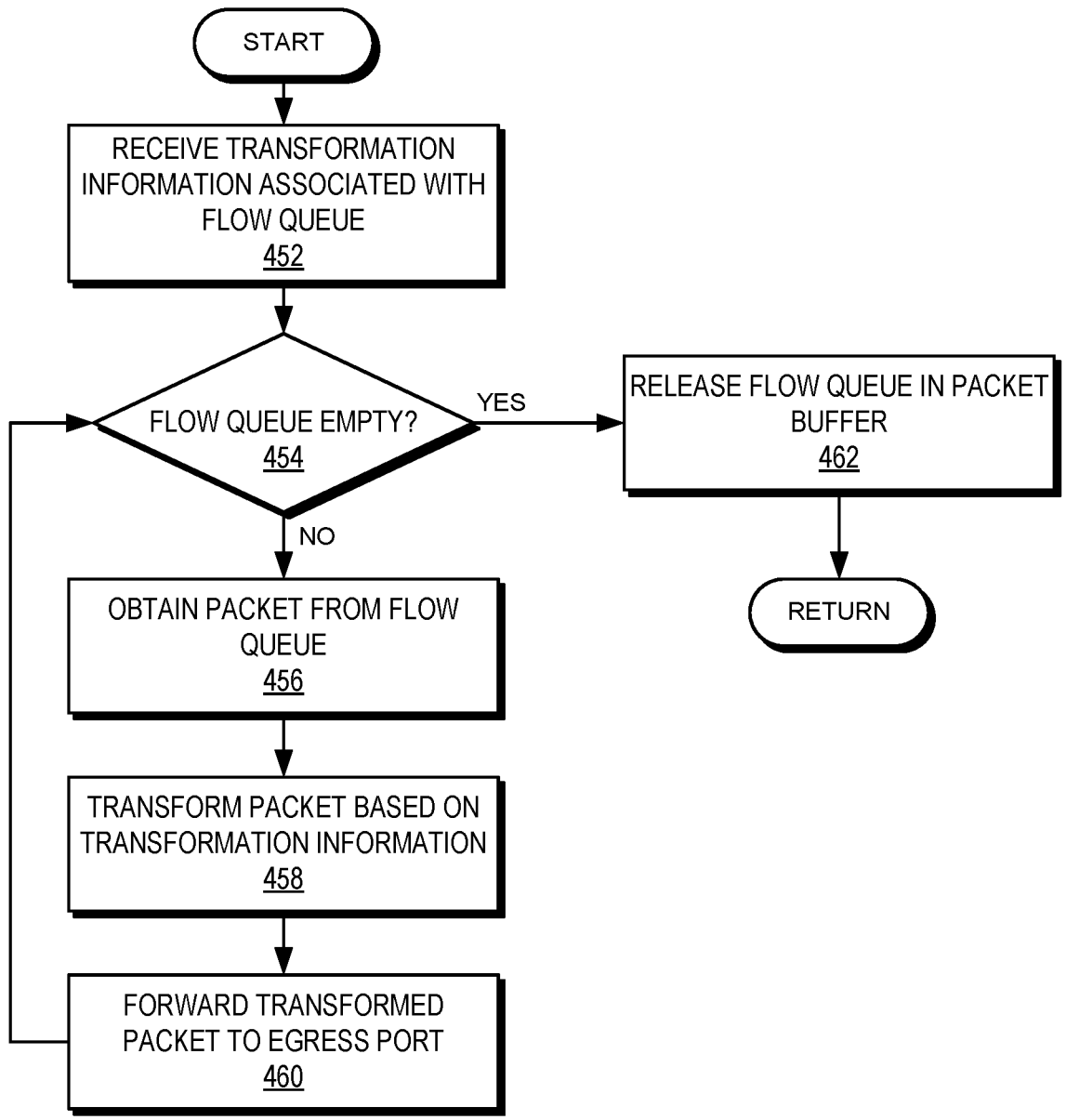
FIG. 4C presents a flowchart illustrating the process of a switch processing packets in a flow queue in response to the availability of transformation information, in accordance with an aspect of the present application.

FIG. 4C presents a flowchart illustrating the process of a switch processing packets in a flow queue in response to the availability of transformation information, in accordance with an aspect of the present application. During operation, the switch can receive the transformation information associated with the flow queue (operation 452) and determine whether the flow queue is empty (operation 454). If the flow queue is not empty, the switch can obtain a packet from the flow queue (operation 456). For example, to ensure that the packets in the flow queue are forwarded sequentially, the switch can obtain the packet at the head of the queue based on a FIFO order.

The switch can then transform the packet based on the transformation information (operation 458) and forward the transformed packet to the egress port (operation 460). The switch can then repeat this process until the flow queue is empty. Accordingly, the switch can continue to determine whether the flow queue is empty (operation 454). On the other hand, if the flow queue is empty, the switch can release the flow queue in the packet buffer (operation 462). Releasing the flow queue can cause the switch to free the memory allocated for the flow queue. As a result, the freed memory can be reallocated to another flow queue associated with another flow.

Figure 5A:
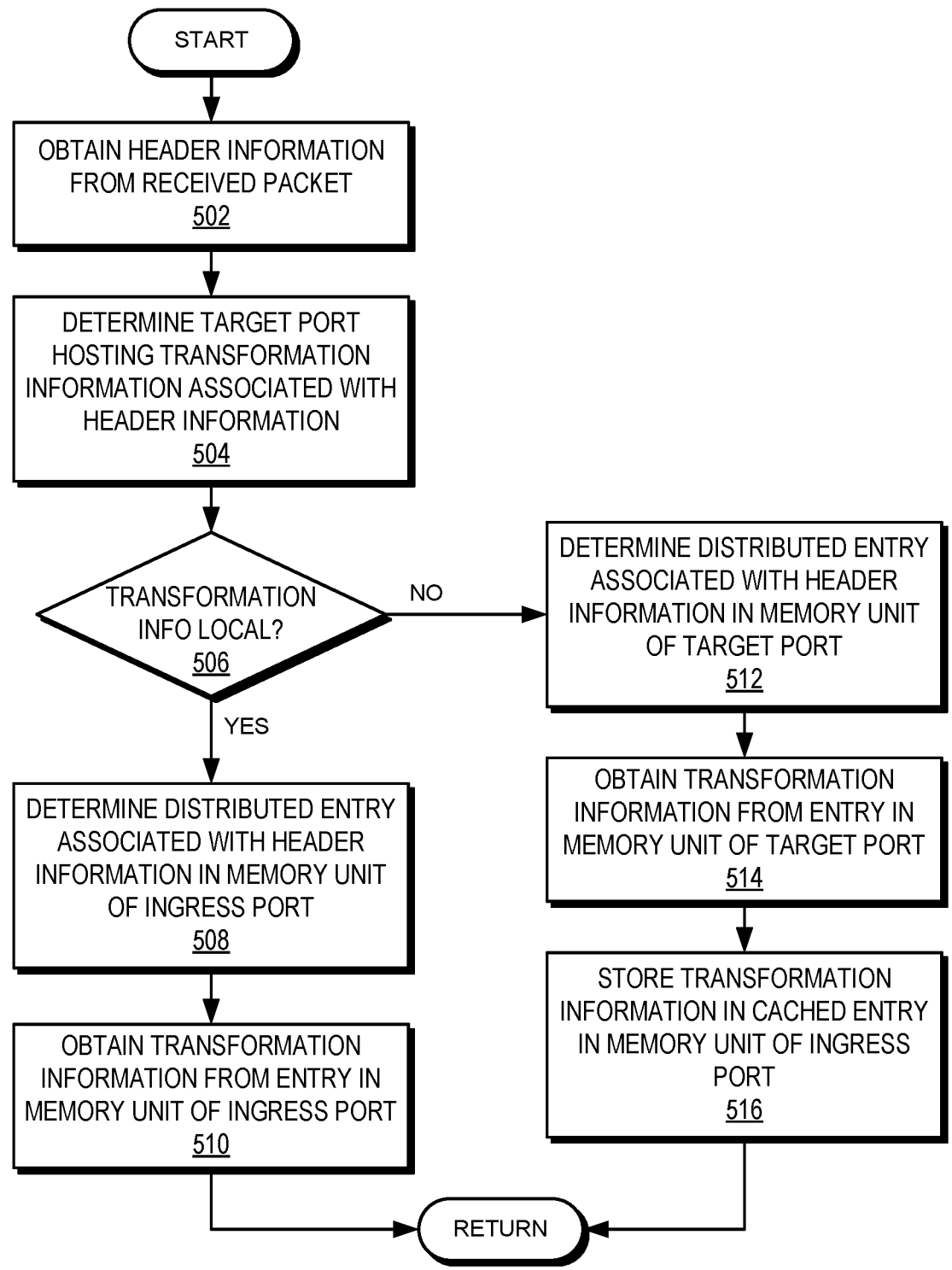
FIG. 5A presents a flowchart illustrating the process of a switch obtaining packet transformation information stored in a distributed manner in the forwarding hardware of the switch, in accordance with an aspect of the present application.

FIG. 5A presents a flowchart illustrating the process of a switch obtaining packet transformation information stored in a distributed manner in the forwarding hardware of the switch, in accordance with an aspect of the present application. During operation, the switch can obtain the header information from a received packet (operation 502) and determine a target port hosting the transformation information associated with the header information (operation 504). The switch can then determine whether the transformation information is local (operation 506). For example, if the target port is the ingress port of the packet, the transformation information can be local.

If the transformation information is local, the switch can determine a distributed entry associated with the header information in the memory unit of the ingress port (operation 508). The switch can then obtain the transformation information from the entry in the memory unit of the ingress port (operation 510). On the other hand, if the transformation information is not local, the switch can determine a distributed entry associated with the header information in the memory unit of the target port (operation 512) and obtain the transformation information from the entry in the memory unit of the ingress port (operation 514). The switch can store the transformation information in a cached entry in the memory unit of the ingress port (operation 516).

Figure 5B:
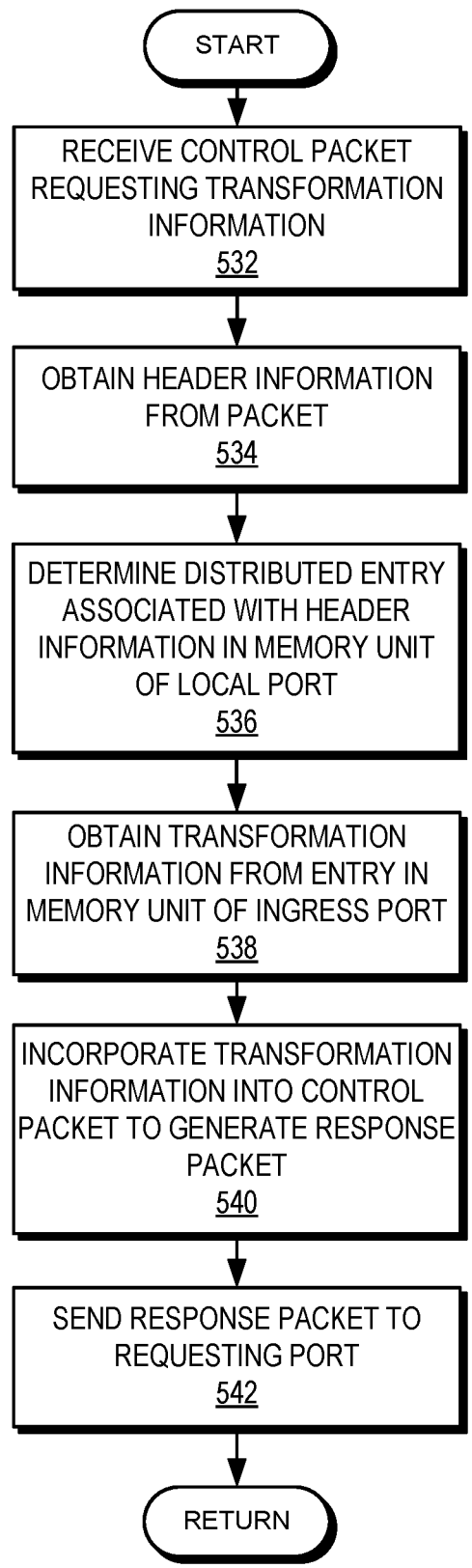
FIG. 5B presents a flowchart illustrating the process of a target port of a switch providing packet transformation information, in accordance with an aspect of the present application.

FIG. 5B presents a flowchart illustrating the process of a target port of a switch providing packet transformation information, in accordance with an aspect of the present application. During operation, the switch can receive a control packet requesting transformation information (operation 532) and obtain the header information from the packet (operation 534). The switch can then determine a distributed entry associated with the header information in the memory unit of the local port (operation 536). The system can obtain the transformation information from the entry in the memory unit of the local port (operation 538) and incorporate the transformation information into the control packet to generate a response packet (operation 540). The switch can then send the response packet to the requesting port (operation 542).

Figure 5C:
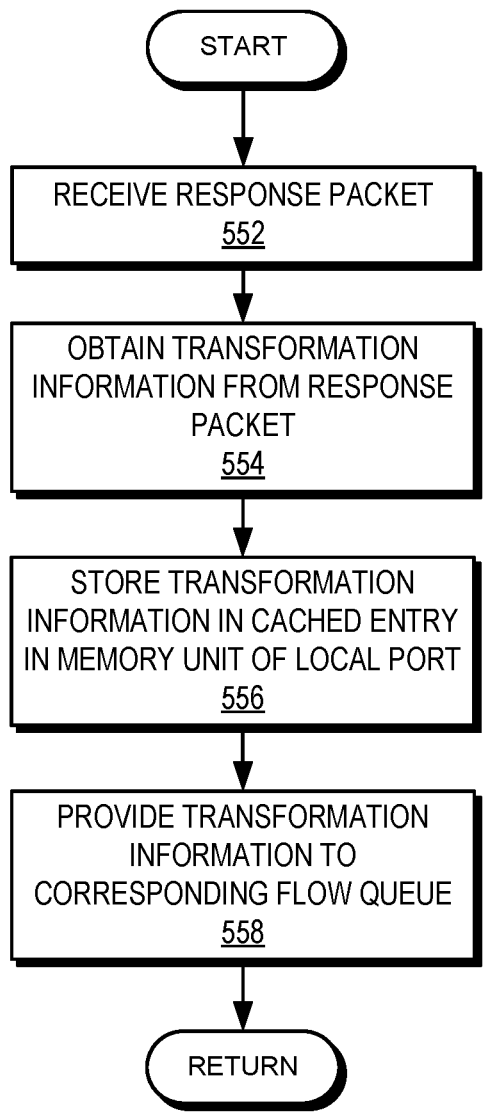
FIG. 5C presents a flowchart illustrating the process of a requesting port of a switch receiving packet transformation information, in accordance with an aspect of the present application.

FIG. 5C presents a flowchart illustrating the process of a requesting port of a switch receiving packet transformation information, in accordance with an aspect of the present application. During operation, the switch can receive a response packet (operation 552) and obtain the transformation information from the response packet (operation 554). The switch can then store the transformation information in a cached entry in the memory unit of the local port (operation 556) and provide the transformation information to the corresponding flow queue (operation 558).

Figure 6:
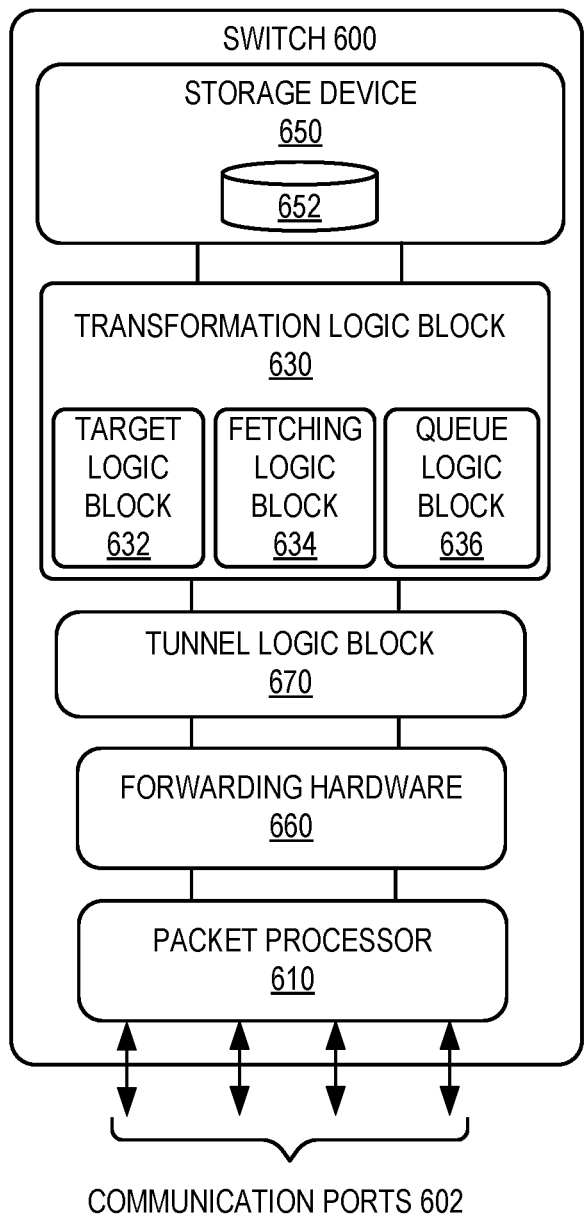
FIG. 6 illustrates an example of a switch supporting distributed storage of packet transformation information in the forwarding hardware, in accordance with an aspect of the present application.

FIG. 6 illustrates an example of a switch supporting distributed storage of packet transformation information in the forwarding hardware, in accordance with an aspect of the present application. In this example, a switch 600 can include a number of communication ports 602, a packet processor 610, and a storage device 650. Switch 600 can also include forwarding hardware 660 (e.g., processing hardware of switch 600, such as its application-specific integrated circuit (ASIC) chips), which includes information based on which switch 600 processes packets (e.g., determines output ports for packets). Packet processor 610 can extract and processes header information from the received packets. Packet processor 610 can identify a switch identifier (e.g., a MAC address and/or an IP address) associated with switch 600 in the header of a packet.

Communication ports 602 can include inter-switch communication channels for communication with other switches and/or user devices. The communication channels can be implemented via a regular communication port and based on any open or proprietary format. Communication ports 602 can include one or more Ethernet ports capable of receiving frames encapsulated in an Ethernet header. Communication ports 602 can also include one or more IP ports capable of receiving IP packets. An IP port is capable of receiving an IP packet and can be configured with an IP address. Packet processor 610 can process Ethernet frames and/or IP packets. A respective port of communication ports 602 may operate as an ingress port and/or an egress port.

Switch 600 can maintain a database 652 (e.g., in storage device 650). Database 652 can be a relational database and may run on one or more Database Management System (DBMS) instances. Database 652 can store information associated with routing, configuration, and interface of switch 600. A copy of a respective TDS of switch 600 may be maintained in database 652. Switch 600 can include a tunnel logic block 670 that can establish a tunnel with a remote switch, thereby allowing switch 600 to operate as a tunnel endpoint. Switch 600 can include a transformation logic block 630 that can allow switch 600 to store transformation in forwarding hardware 660 in a distributed way. Transformation logic block 630 can be deployed in the control circuitry of a respective port (e.g., the port controller) of switch 600.

Transformation logic block 630 can include a target logic block 632, a fetching logic block 634, and a queue logic block 636. Target logic block 632 can determine the target port (and switch) for a respective piece of transformation information learned by switch 600. Target logic block 632 can also determine the location of the transformation information associated with the header information of a received packet. Fetching logic block 634 can fetch transformation information from a remote port, which can be in switch 600 or a nearby switch, to an ingress port of a packet. Queue logic block 636 can queue a packet of a flow in a flow queue associated with the flow during the fetching process.

One aspect of the present technology can facilitate the efficient storage of transformation information in a switch. Here, a respective port of the switch can be equipped with a memory device capable of storing transformation information used for performing packet transformation associated with packet forwarding. During operation, the switch can apply a selection mechanism to transformation information learned at the switch for identifying a port of the switch for storing the transformation information. The switch can then store the transformation information in the memory device of the port. Upon receiving a packet, the ingress port of the packet can apply the selection mechanism to the header information of the packet for determining a location that stores a first piece of transformation information associated with the packet. The location can correspond to a first memory device of a first port. The ingress port can then obtain the first piece of transformation information by looking up the header information in the first memory device and storing the first piece of transformation information in a local memory device of the ingress port. Subsequently, the ingress port can transform the packet based on the first piece of transformation information for determining an egress port for the packet.

In a variation on this aspect, the switch can apply the selection mechanism by applying a hash function that generates an output indicating the target port.

In a variation on this aspect, the transformation information can include one or more of: a media access control (MAC) address, an Internet Protocol (IP) address, a fabric address, a switching label, a port identifier, and a tunnel identifier.

In a variation on this aspect, transforming the packet can include one or more of: translating a MAC address of the packet to a fabric address, changing source and destination MAC addresses of the packet, transforming a layer-3 address, encapsulating the packet with a tunnel header, mirroring the packet to a port, modifying the packet for a different version of a protocol and adding a virtual local area network (VLAN) tag to the packet.

In a variation on this aspect, the first port can be distinct from the ingress port. The ingress port can obtain the first piece of transformation information by fetching the first piece of transformation information from the first memory device to a second memory device of the ingress port via a switching fabric of the switch.

In a further variation, the ingress port can store the packet in a flow queue, which can be dedicated to a data flow of the packet, of the ingress port during the fetching of the first piece of transformation information. When the first piece of transformation information becomes available at the ingress port, the ingress port can apply the first piece of transformation information to a respective packet of the flow queue.

In a further variation, to fetch the first piece of transformation information, the ingress port can send a control packet comprising the header information to the first port. Subsequently, the ingress port can receive a response packet comprising the transformation information from the first port.

In a further variation, the first port can be one of: a port of the switch and a port of a second switch. Here, the selection mechanism can select the second switch.

In a variation on this aspect, the local memory device of the ingress port can include a first set of transformation information and a second set of transformation information. Here, the selection mechanism can select the ingress port as a target location for storing the first set of transformation information. On the other hand, the ingress port can fetch the second set of transformation information from one or more remote ports.

In a further variation, the ingress port can age out a piece of transformation information of the second set of transformation information in response to being inactive for a period.

One aspect of the present technology can facilitate the efficient storage of transformation information in a switch. Here, a respective port of the switch can be equipped with a memory device capable of storing transformation information used for performing packet transformation associated with packet forwarding. During operation, upon receiving a first packet of a data flow at an ingress port of the switch, the ingress port can apply a selection mechanism to the header information of the first packet for determining a location that stores a first piece of transformation information associated with the first packet. Here, the location can correspond to a first memory device of a first port. The ingress port can then store one or more packets, which can include the first packet, of the data flow in a flow queue of the ingress queue until the first piece of transformation information becomes available at the ingress queue. The flow queue can be dedicated to the data flow. Here, the ingress queue supports a plurality of flow queues. The ingress port can fetch the first piece of transformation information from the first memory device to a local memory device of the ingress port. Subsequently, the ingress port can transform the one or more packets in the flow queue based on the first piece of transformation information for determining an egress port for the one or more packets.

In a variation on this aspect, the ingress port can transform a respective packet of the data flow received subsequent to the one or more packets based on the first piece of transformation information without storing the packet in the flow queue.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block or a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method comprising:
   applying, by a switch, a selection mechanism to transformation information learned at the switch for identifying a port of the switch for storing the transformation information, wherein a respective port of the switch is equipped with a memory device capable of storing transformation information, and wherein the transformation information is used for performing packet transformation associated with packet forwarding;
   storing the transformation information in the memory device of the port;
   in response to receiving a packet at an ingress port of the switch, applying, by the ingress port, the selection mechanism to header information of the packet for determining a location that stores a first piece of transformation information associated with the packet, wherein the location corresponds to a first memory device of a first port;
   obtaining, by the ingress port, the first piece of transformation information by looking up the header information in the first memory device and storing the first piece of transformation information in a local memory device of the ingress port; and
   transforming the packet based on the first piece of transformation information for determining an egress port for the packet.

2. The method of claim 1, wherein applying the selection mechanism further comprises applying a hash function that generates an output indicating a target port.

3. The method of claim 1, wherein the transformation information comprises one or more of: a media access control (MAC) address, an Internet Protocol (IP) address, a fabric address, a switching label, a port identifier, and a tunnel identifier.

4. The method of claim 1, wherein transforming the packet includes one or more of:
   translating a MAC address of the packet to a fabric address;
   changing source and destination MAC addresses of the packet;
   transforming a layer-3 address;
   encapsulating the packet with a tunnel header;
   mirroring the packet to a port;
   modifying the packet for a different version of a protocol; and
   adding a virtual local area network (VLAN) tag to the packet.

5. The method of claim 1, wherein the first port is distinct from the ingress port;
   wherein obtaining the first piece of transformation information further comprises fetching the first piece of transformation information from the first memory device to the local memory device of the ingress port via a switching fabric of the switch.

6. The method of claim 5, further comprising:
   storing the packet in a flow queue of the ingress port during the fetching of the first piece of transformation information, wherein the flow queue is dedicated to a data flow of the packet; and
   in response to the first piece of transformation information being available at the ingress port, applying the first piece of transformation information to a respective packet of the flow queue.

7. The method of claim 5, wherein fetching the first piece of transformation information further comprises:
   sending a control packet comprising the header information from the ingress port to the first port; and
   receiving a response packet comprising the transformation information from the first port to the ingress port.

8. The method of claim 5, wherein the first port is one of:
   a port of the switch; and
   a port of a second switch, wherein the selection mechanism selects the second switch.

9. The method of claim 1, wherein the local memory device of the ingress port includes a first set of transformation information and a second set of transformation information;
   wherein the selection mechanism selects the ingress port as a target location for storing the first set of transformation information; and
   wherein the ingress port fetches the second set of transformation information from one or more remote ports.

10. The method of claim 9, further comprising aging out, by the ingress port, a piece of transformation information of the second set of transformation information in response to being inactive for a period.

11. A non-transitory computer-readable storage medium storing instructions that when executed by a computer cause the computer to perform a method, the method comprising:
    applying, by a switch, a selection mechanism to transformation information learned at the switch for identifying a port of the switch for storing the transformation information, wherein a respective port of the switch is equipped with a memory device capable of storing transformation information, and wherein the transformation information is used for performing packet transformation associated with packet forwarding;
    storing the transformation information in the memory device of the port;
    in response to receiving a packet at an ingress port of the switch, applying, by the ingress port, the selection mechanism to header information of the packet for determining a location that stores a first piece of transformation information associated with the packet, wherein the location corresponds to a first memory device of a first port;

obtaining, by the ingress port, the first piece of transformation information by looking up the header information in the first memory device and storing the first piece of transformation information in a local memory device of the ingress port; and transforming the packet based on the first piece of transformation information for determining an egress port for the packet.

12. The non-transitory computer-readable storage medium of claim 11, wherein applying the selection mechanism further comprises applying a hash function that generates an output indicating a target port.

13. The non-transitory computer-readable storage medium of claim 11, wherein the transformation information comprises one or more of: a media access control (MAC) address, an Internet Protocol (IP) address, a fabric address, a switching label, a port identifier, and a tunnel identifier.

14. The non-transitory computer-readable storage medium of claim 11, wherein transforming the packet includes one or more of:

translating a MAC address of the packet to a fabric address;

changing source and destination MAC addresses of the packet;

transforming a layer-3 address;

encapsulating the packet with a tunnel header;

mirroring the packet to a port;

modifying the packet for a different version of a protocol; and adding a virtual local area network (VLAN) tag to the packet.

15. The non-transitory computer-readable storage medium of claim 11, wherein the first port is distinct from the ingress port;

wherein obtaining the first piece of transformation information further comprises fetching the first piece of transformation information from the first memory device to a second memory device of the ingress port via a switching fabric of the switch.

16. The non-transitory computer-readable storage medium of claim 15, wherein fetching the first piece of transformation information further comprises:

sending a control packet comprising the header information from the ingress port to the first port; and receiving a response packet comprising the transformation information from the first port to the ingress port.

17. The non-transitory computer-readable storage medium of claim 15, wherein the first port is one of:

a port of the switch; and a port of a second switch, wherein the selection mechanism selects the second switch.

18. The non-transitory computer-readable storage medium of claim 11, wherein the local memory device of the ingress port includes a first set of transformation information and a second set of transformation information;

wherein the selection mechanism selects the ingress port as a target location for storing the first set of transformation information; and wherein the ingress port fetches the second set of transformation information from one or more remote ports.

19. A method comprising:

in response to receiving a first packet of a data flow at an ingress port of a switch, applying, by the ingress port, a selection mechanism to header information of the first packet for determining a location that stores a first piece of transformation information associated with the first packet, wherein the location corresponds to a first memory device of a first port, wherein a respective port of the switch is equipped with a memory device capable of storing transformation information, and wherein the transformation information is used for performing packet transformation associated with packet forwarding;

storing one or more packets, which includes the first packet, of the data flow in a flow queue of the ingress queue until the first piece of transformation information becomes available at the ingress queue, wherein the flow queue is dedicated to the data flow, and wherein the ingress queue supports a plurality of flow queues;

fetching, by the ingress port, the first piece of transformation information from the first memory device to a local memory device of the ingress port; and transforming, by the ingress port, the one or more packets in the flow queue based on the first piece of transformation information for determining an egress port for the one or more packets.

20. The method of claim 19, further comprising transforming, by the ingress port, a respective packet of the data flow received subsequent to the one or more packets based on the first piece of transformation information without storing the packet in the flow queue.

* * * * *